United States Patent [19]

Böck et al.

[11] Patent Number: 4,486,012
[45] Date of Patent: Dec. 4, 1984

[54] TRANSPORTING ARRANGEMENT FOR SHEET LIKE DATA CARRIERS

[75] Inventors: Georg Böck, Munich; Erich Schlick, Lohhof; Günther Schnall, Eching, all of Fed. Rep. of Germany

[73] Assignee: Agfa-Gevaert AG, Leverkusen, Fed. Rep. of Germany

[21] Appl. No.: 493,350

[22] Filed: May 9, 1983

[30] Foreign Application Priority Data

May 7, 1982 [DE] Fed. Rep. of Germany ....... 3217115

[51] Int. Cl.³ .............................................. B65H 5/22
[52] U.S. Cl. ................................. 271/3; 271/DIG. 9; 271/186; 271/178; 271/176
[58] Field of Search ............... 271/3, DIG. 9, 65, 184, 271/186, 178, 180, 181, 273, 176, 314; 198/457

[56] References Cited

U.S. PATENT DOCUMENTS

| | | | |
|---|---|---|---|
| 3,046,009 | 7/1962 | Hartel | 271/186 |
| 3,944,212 | 3/1976 | Stange et al. | 271/65 |
| 4,067,568 | 1/1978 | Irvine | 271/178 |
| 4,253,655 | 3/1981 | Nishimoto | 271/178 |

Primary Examiner—Duane A. Reger
Assistant Examiner—John A. Carroll
Attorney, Agent, or Firm—Michael J. Striker

[57] ABSTRACT

An arrangement for transporting a sheet-like data carrier with reversing its direction of movement and at the same time maintaining its original orientation has first and second transporting paths and a reversing path, a turnable lever located between the first and second transporting paths and having a length and a mounting point selected so that one of the supporting rollers arranged on the lever can be brought to abutment against one transporting roller of the second transporting path and simultaneously the other supporting roller of the lever comes to a position below the first transporting path, a sensing element arranged at the reversing path and operative for sensing a front edge of the data carrier, and a controlling element operative to control the movement of transporting rollers of the reversing path and the turnable lever in response to the sensing by the sensing means, so that reversing of transporting direction of the transporting rollers of the reversing path and turning of the turnable lever to a position in which the other supporting roller comes to abutment against one transporting roller of the second transporting path takes place before the front edge of the data carrier has passed the supporting roller located below the first transporting path.

6 Claims, 1 Drawing Figure

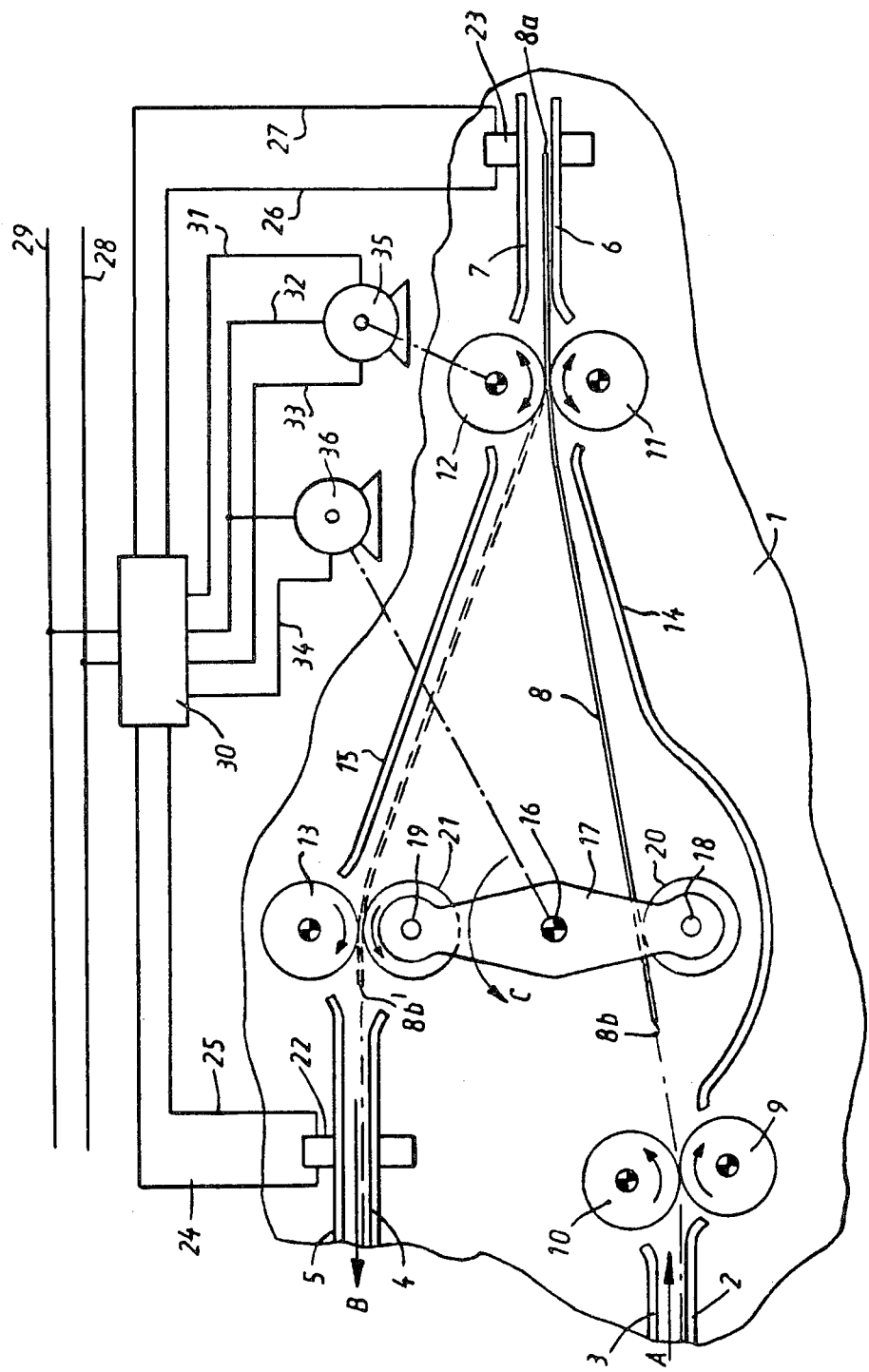

TRANSPORTING ARRANGEMENT FOR SHEET LIKE DATA CARRIERS

BACKGROUND OF THE INVENTION

The present invention relates to a transporting arrangement for sheet-like data carriers.

Transporting arrangements of the above mentioned general type are known in the art. In known transporting arrangements, a data carrier is supplied from a first transporting path to and is reversed in a reversing path with maintenance of its original orientation, and then advanced by a turning or deflecting device into a second transporting path. Such a transporting arrangement is disclosed, for example, in the German Pat. No. 1,916,863 and in the German Offenlegungsschrift No. 2,521,932. This arrangement is used for transporting a data carrier withdrawn from the lower side of a stack to a reading or illuminating location and subsequently placing the data carrier without changing its orientation onto the upper side of the stack. Alternatively, the arrangement can cooperate with a reversing loop, and the like, to turn a data carrier which must be illuminated from both sides, or after illumination placed or collated in a predetermined orientation. The known arrangement possesses the disadvantage that the edge of the data carrier during introducing into the second transport path must be again threaded into it. In the case of a repeated transportation of an original to be reproduced or observed, this can lead to wear and damage to the edge of the original.

SUMMARY OF THE INVENTION

Accordingly, it is an object of the present invention to provide an arrangement for transporting a sheet-like data carrier, which avoids the disadvantages of the prior art.

More particularly, it is an object of the present invention to provide an arrangement for transporting a sheet-like data carrier, in which it is not necessary for introduction of the data carrier into the second transport path to thread each time the edge of the data carrier into the second transport path.

It is also an object of the present invention to provide an arrangement for transporting a sheet-like data carrier, in which in the event of repeated transportation an original to be reproduced or illuminated is not subjected to an increased wear and damage as in the prior-art arrangements.

In keeping with these objects and with others which will become apparent hereinafter, one feature of the present invention resides, briefly stated, in an arrangement for transporting a sheet-like data carrier which has a first transporting path with a continuously rotating first pair of transporting rollers, a second transporting path with one continuously rotating second transporting roller, a reversing path toward which the first and second transport paths are open and which has a third transporting roller, a turnable lever located between the first and second transporting paths and provided with two supporting rollers at its ends, wherein the length of the turning lever and its mounting point are selected so that one of the supporting rollers is bringable to abutment against the one second transporting roller of the second transporting path and simultaneously the other supporting roller comes to a position below the first transporting path, sensing means arranged at the reversing path and operative for sensing a front edge of the data carrier, and controlling means operative to control the movement of the third pair of transporting rollers of the reversing path and the turnable lever in response to the sensing by the sensing means, so that reversing of the transporting direction of the third pair of transporting rollers of the reversing path and turning of the turnable lever to a position in which the other supporting roller comes to abutment against the one second transporting roller of the second transporting path takes place before the front edge of the data carrier has passed the supporting roller located below the first transporting path.

When the arrangement is designed in accordance with the present invention, it is no longer necessary to thread the edge of the data carrier into the second transporting path after each operation. Thus, wear and the probability of damage to the edge of the data carrier are avoided.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing is a view showing a section of an arrangement for transporting a sheet-like data carrier in accordance with the present invention.

DESCRIPTION OF A PREFERRED EMBODIMENT

An arrangement for transporting a data carrier in accordance with the present invention has a frame which is identified with reference numeral 1. Guiding members 2 and 3 form a first transporting path for a data carrier 8. Guiding members 4 and 5 form a second transporting path in the frame 1 for the data carrier 8. Guiding members 6 and 7 form a reversing path for the data carrier 8 to be transported.

A pair of transporting rollers 9 and 10 are arranged at the end of the first transporting path defined by the guiding members 2 and 3. The transporting rollers 9 and 10 rotate with a constant speed in direction identified by the arrows. A further pair of transporting rollers 11 and 12 are arranged at the entrance of the reversing path defined by the guiding members 6 and 7. The transporting rollers 11 and 12 can be driven in alternating directions of rotation, as identified by the double arrows in the drawing. Further, only one transporting roller 13 is provided at the entrance of the second transporting path defined by the guiding members 4 and 5. The transporting roller 13 is driven in rotation with a constant speed in direction identified by the arrow.

The transport path of the data carrier 8 in the space between the transporting rollers 9–13 is limited from outside by guiding members 14 and 15. In this space, a turnable lever 17 is supported on the frame 1 by a shaft 16. The lever 17 carries axles 18 and 19, and supporting rollers 20 and 21 are freely rotatably mounted on the axles 18 and 19.

A light barrier 22 is arranged at the second transporting path defined by the members 4 and 5. A further light barrier 23 is arranged at the reversing path defined by the guiding members 6 and 7. The light barrier 22 is connected by connecting conductors 24 and 25, and the light barrier 23 is connected by connecting conductors 26 and 27 with a control device 30. The control device 30 is, in turn, connected with a power network identified with reference numerals 28 and 29.

The control device 30 controls a driving motor 35 and a driving motor 36 via conductors 31, 32, 33 and 34. The driving motor 35 is formed as a tandem-motor which can be driven in different directions of rotation. The driving motor 35 drives the transport rollers 11 and 12. The driving motor 36 is connected with the turning lever 17 so as to drive the latter.

The arrangement for transporting sheet-like data carriers described hereinabove operates in the following manner:

The data carrier 8 to be transported is supplied through the continuously rotating transporting rollers 9 and 10 in direction of the arrow A. It runs over the lower supporting roller 20 and is introduced between the transporting rollers 11 and 12. In this phase, the transporting rollers 11 and 12 rotate so that the data carrier 8 continues its movement induced to it by the transporting rollers 9 and 10. The data carrier 8 is thereby introduced into the reversing path defined by the guiding members 6 and 7.

As long as in this movement phase a front edge 8a of the data carrier 8 reaches the light barrier 23, the direction of rotation of the motor 35 is reversed by the control device 30. Simultaneously, the turning lever 17 is turned by the motor 36 in direction of the arrow C, and is thereby brought to the position in which, instead of the supporting roller 21, the supporting roller 20 abuts against the continuously rotating transporting roller 13. During this turning movement, the data carrier end, which is adjacent to its rear edge 8b, is taken along by the roller 20, brought to a position identified by reference numeral 8b', and pressed against the roller 13. It is thereby introduced between the transporting rollers 13 and 20 cooperating with the second transporting path, so that it is not necessary to thread the edge 8b into this roller pair. The edge 8b therefore cannot be subjected to any damage during a plurality of repetitions of this step.

After turning of the turning lever 17, the data carrier 8, which is driven by the roller pairs 11, 12 and 13, 21, continues its way in the new direction of movement and runs in direction identified by the arrow B into the second guiding path defined by the rollers 4 and 5. The edge 8b, which was before a rear edge of the data carrier 8, becomes now a front edge of the same.

As long as the new front edge 8b of the data carrier reaches the light barrier 22, the direction of rotation of the transporting rollers 11 and 12 is again reversed by the control device 30. The arrangement is again ready for introduction of a next data carrier.

It will be understood that each of the elements described above, or two or more together, may also find a useful application in other types of constructions differing from the types described above.

While the invention has been illustrated and described as embodied in an arrangement for transporting sheet-like data carriers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for transporting a sheet-like data carrier with reversing its direction of movement and at the same time maintaining its original orientation, comprising means forming a first transporting path for a data carrier and provided with a continuously rotating first pair of transporting rollers;

means forming a second transporting path for the data carrier and provided with one continuously rotating second transporting roller;

means forming a reversing path for the data carrier and provided with a third pair of transporting rollers which are reversible in their direction of rotation, said first and second transporting paths being open toward said reversing path;

a turnable lever located between said first and second transporting paths and provided with two supporting rollers at its ends, said turning lever having a lever length and being turnably mounted in a mounting point, wherein said length of said turning lever and said mounting point being selected so that one of said supporting rollers is bringable to abutment against said one second transporting roller of said second transporting path, whereas simultaneously the other supporting roller comes to a position below said first transporting path;

sensing means arranged at said reversing path and operative for sensing a front edge of the data carrier; and controlling means operative to control the movement of said third pair of transporting rollers of said reversing path and said turnable lever in response to said sensing by said sensing means, so that reversing of transporting direction of said third pair of transporting rollers of said reversing path and turning of said turnable lever to a position in which the other supporting roller comes to abutment against said one second transporting roller of said second transporting path takes place before the front edge of the data carrier has passed the supporting roller located below said first transporting path.

2. An arrangement as defined in claim 1, wherein said first pair of transporting rollers of said first transporting path and said second pair of transporting rollers of said second transporting path have predetermined transporting directions, said supporting rollers of said turnable lever having directions of rotation coinciding with said transporting directions of said first pair of transporting rollers and said second pair of transporting rollers.

3. An arrangement as defined in claim 1; and further comprising further sensing means arranged at said second transporting means, and further controlling means arranged to control said third pair of transporting rollers of said reversing path.

4. An arrangement as defined in claim 3, wherein said first-mentioned controlling means includes a driving element arranged to turn said lever, said further controlling means including a further driving element arranged to drive said third pair of rollers of said reversing path, said first-mentioned and second transporting means also including a common controlling element operating in response to said sensing by said first-mentioned sensing means and by said further sensing means so as to actuate said first-mentioned driving element and said further driving element, respectively.

5. An arrangement as defined in claim 1, wherein said sensing means arranged at said reversing path for sensing the front edge of the data carrier is formed as a light barrier.

6. An arrangement as defined in claim 4, wherein each of said first-mentioned sensing means arranged at said reversing path and said further sensing means arranged at said second transporting path is formed as a light barrier.

* * * * *